US010984056B2

(12) United States Patent
Duan et al.

(10) Patent No.: US 10,984,056 B2
(45) Date of Patent: Apr. 20, 2021

(54) SYSTEMS AND METHODS FOR EVALUATING SEARCH QUERY TERMS FOR IMPROVING SEARCH RESULTS

(71) Applicant: Wal-Mart Stores, Inc., Bentonville, AR (US)

(72) Inventors: Huizhong Duan, Redwood City, CA (US); Andrei Lopatenko, Sunnyvale, CA (US); Monadhika Sharma, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 747 days.

(21) Appl. No.: 14/701,335

(22) Filed: Apr. 30, 2015

(65) Prior Publication Data
US 2016/0321365 A1 Nov. 3, 2016

(51) Int. Cl.
*G06F 16/9535* (2019.01)
*G06F 16/33* (2019.01)

(52) U.S. Cl.
CPC ...... *G06F 16/9535* (2019.01); *G06F 16/3346* (2019.01)

(58) Field of Classification Search
CPC .................. G06F 17/30867; G06F 17/30687
USPC ........................................................ 707/727
See application file for complete search history.

(56) References Cited

U.S. PATENT DOCUMENTS

| 8,504,562 | B1 * | 8/2013 | Ikeda | G06F 16/3338 |
| | | | | 707/723 |
| 8,868,570 | B1 * | 10/2014 | Skut | G06F 16/951 |
| | | | | 707/749 |
| 8,954,422 | B2 * | 2/2015 | Hasan | G06F 16/24578 |
| | | | | 707/723 |
| 9,171,088 | B2 * | 10/2015 | Thakur | G06F 16/954 |
| 9,323,830 | B2 * | 4/2016 | Miao | G06F 16/951 |
| 9,607,264 | B2 * | 3/2017 | Downs | G06N 3/08 |
| 9,928,296 | B2 * | 3/2018 | Li | G06F 16/374 |
| 2011/0161309 | A1 * | 6/2011 | Lung | G06F 16/24578 |
| | | | | 707/709 |
| 2013/0086509 | A1 * | 4/2013 | Satyanarayana | G06F 16/3322 |
| | | | | 715/781 |
| 2013/0246383 | A1 * | 9/2013 | White | G06F 16/9535 |
| | | | | 707/706 |
| 2014/0025668 | A1 * | 1/2014 | Lin | G06F 16/24578 |
| | | | | 707/723 |

(Continued)

*Primary Examiner* — Ashish Thomas
*Assistant Examiner* — Abdullah A Daud
(74) *Attorney, Agent, or Firm* — Bryan Cave Leighton Paisner LLP

(57) ABSTRACT

A system for displaying product information to a customer is described herein. The system includes a database and a server including a processor. The processor is programmed to receive a search query including a plurality of search terms via a computing device. The processor selects a search term from the plurality of search terms and determines an optionalization probability associated with the selected search term. The processor generates a search request as a function of the search query and determines whether to retain the selected search term with the search request as a function of the optionalization probability. The processor retrieves product records from the database as a function of the search request, and generates and displays a product search result including product information associated with the retrieved product records.

20 Claims, 10 Drawing Sheets

(56) References Cited

U.S. PATENT DOCUMENTS

| | | | |
|---|---|---|---|
| 2014/0067786 A1* | 3/2014 | Newey | G06F 16/9535 707/708 |
| 2014/0298168 A1* | 10/2014 | Son | G06F 40/232 715/257 |
| 2015/0310527 A1* | 10/2015 | Warren | G06Q 30/0623 705/26.62 |
| 2016/0179885 A1* | 6/2016 | Zhu | G06N 7/005 707/768 |
| 2016/0203130 A1* | 7/2016 | Roque | G06F 16/93 707/741 |
| 2017/0193579 A1* | 7/2017 | Goldberg | G06Q 30/0625 |

\* cited by examiner

| Search Query | Conversion Rate |
|---|---|
| "wedding unity candle set" | 25% |
| "unity candle set" | 45% |
| "wedding candle set" | 30% |
| "candle set" | 20% |

FIG. 10

| Search Query | Selected Term | Bigram /Trigram | Frequency Score |
|---|---|---|---|
| "18 bike for boy" | for | "bike for" | .71 |
| "18 bike for boy" | for | "for boy" | .80 |
| "18 bike for boy" | for | "18 bike for" | .4 |
| "18 bike for boy" | for | "bike for boy" | .6 |

FIG. 11

| Search Query | Selected Term | Optionalization Probability |
|---|---|---|
| "wedding unity candle set" | candle | 13% |
| "wedding unity candle set" | set | 57% |
| "wedding unity candle set" | unity | 12% |
| "wedding unity candle set" | wedding | 18% |
| "h p laser printer a-35 ink cartridge" | a-35 | 0% |
| "h p laser printer a-35 ink cartridge" | cartridge | 54% |
| "h p laser printer a-35 ink cartridge" | h | 7% |
| "h p laser printer a-35 ink cartridge" | ink | 81% |
| "h p laser printer a-35 ink cartridge" | laser | 41% |
| "h p laser printer a-35 ink cartridge" | p | 8% |
| "h p laser printer a-35 ink cartridge" | printer | 53% |

FIG. 12

SYSTEMS AND METHODS FOR EVALUATING SEARCH QUERY TERMS FOR IMPROVING SEARCH RESULTS

FIELD OF THE DISCLOSURE

The present invention relates to evaluating search query terms for use in improving search results, and more particularly, to systems, methods, and computer-readable storage media that determines a query term optionalization for terms included in a search query received via an eCommerce search engine, and generates search results that are display to a user.

BACKGROUND

Many consumers desire to order items or goods remotely, e.g., on-line, through the Internet, or using a specially designed application or app on a personal computer or mobile device, such as a tablet or cell phone. At least some known web hosting systems include search engines that allow consumers to enter search criteria and generate search results based on the consumer's search criteria. Known search engines may generate and display product lists to consumers via a website including products that are selected based on the search criteria. Some known search engines may also generate search relevance scores associated with selected products based on the search terms entered by the consumer.

Long queries are common in at least some known keyword search systems because users tend to use more natural language queries and copied texts as queries. Typically, more noisy terms are present in longer queries. Because these terms will retrieve additional search items, search accuracy will be impacted. For example, at least some known search engine consider every term for text match, using search algorithms such as Inverse Document Frequency (IDF) and/or Term Entropy. However, these search algorithms do not consider the necessity of term, do not consider the context of term, and do not consider user error, which may result in large recall sets. Moreover, not all terms in user queries may be useful for search. In eCommerce websites, considering every term for text match may lead to wrong results, and a poor user experience.

In addition, in response to a product search request, at least some known search engines retrieve each product record contained in a database and display each product record in a sorted list. Because of the number of product records that may be included in a product database, at least some known search engines require significant computing time and resources to generate and display the sorted product lists to the consumer. As the amount of product records being included in a database increases, the amount of computing resources that are required to perform the search functions increase, thus reducing the overall performance of known web hosting systems.

The present invention is aimed at one or more of the problems identified above.

SUMMARY OF THE INVENTION

In different embodiments of the present invention, systems, methods, and computer-readable storage media allow users to display relevant product information to a consumer via a website.

In one embodiment, a system for displaying product information to a customer is provided. The system includes a database and a server including a processor. The database includes a plurality of product records including product information associated with a plurality of products. The processor is programmed to receive a search query from user via a user computing device. The search query includes a plurality of search terms. The processor selects a search term from the plurality of search terms and determines an optionalization probability associated with the selected search term. The processor generates a search request as a function of the search query and determines whether to retain the selected search term with the search request as a function of the optionalization probability. The processor retrieves product records from the database as a function of the search request, and generates and displays a product search result including product information associated with the retrieved product records.

In another embodiment a method for displaying product information to a customer is provided. The method includes receiving a search query including a plurality of search terms via a computing device, selecting a search term from the plurality of search terms, and determining an optionalization probability associated with the selected search term. The method includes generating a search request as a function of the search query including determining whether to retain the selected search term with the search request as a function of the optionalization probability. The method includes retrieving product records from a database as a function of the search request, and generating and displaying a product search result including product information associated with the retrieved product records via the computing device.

In yet another embodiment, one or more non-transitory computer-readable storage media, having computer-executable instructions embodied thereon are provided. When executed by at least one processor, the computer-executable instructions cause the processor to receive a search query including a plurality of search terms via a computing device, select a search term from the plurality of search terms, and determine an optionalization probability associated with the selected search term. The processor generates a search request as a function of the search query including determining whether to retain the selected search term with the search request as a function of the optionalization probability. The processor retrieves product records from a database as a function of the search request, and generates and displays a product search result including product information associated with the retrieved product records via the computing device.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 6-12 are illustrations of exemplary screenshots from the system of FIG. 1, according to embodiments of the present invention.

Figure 1:
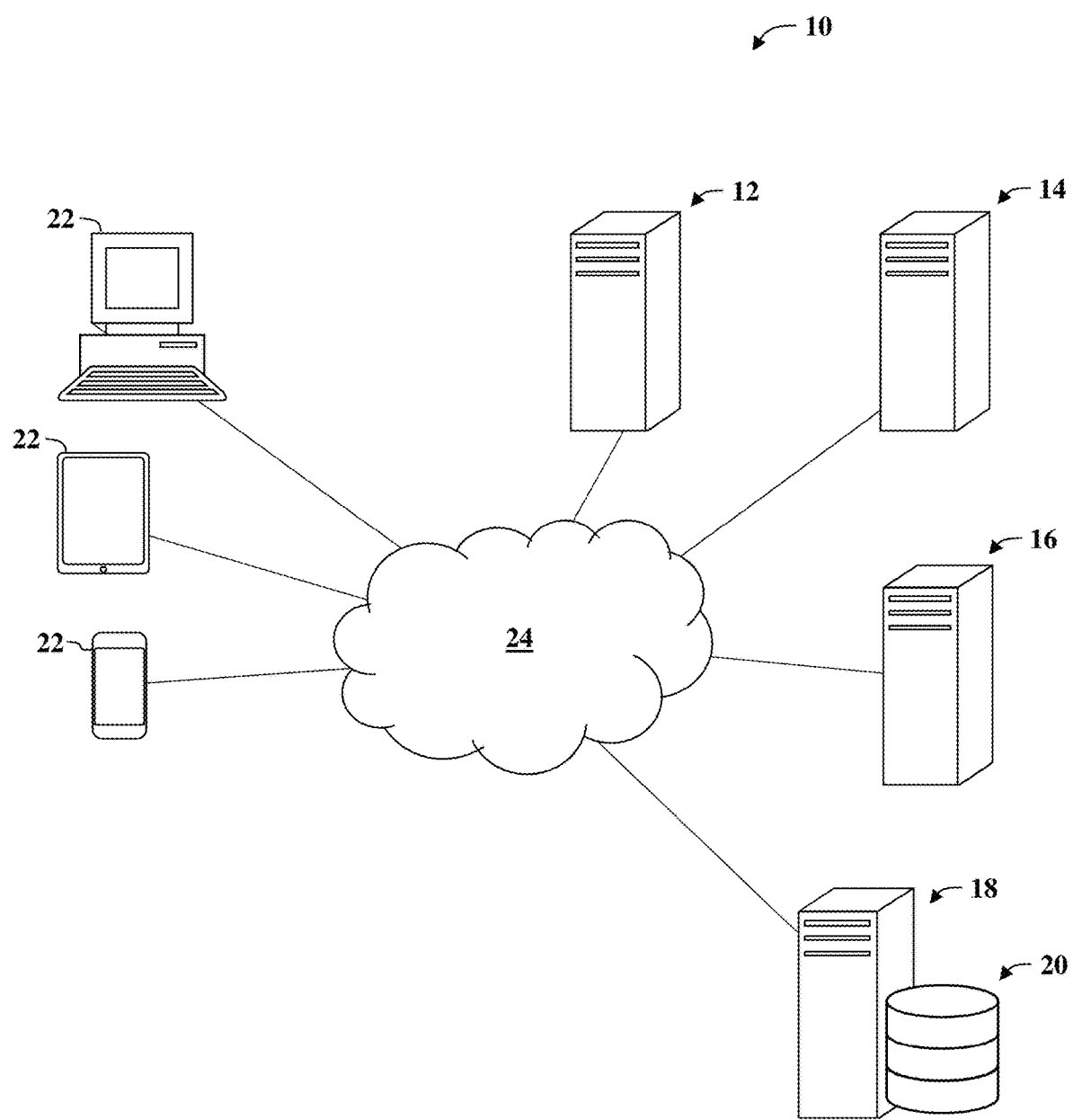
FIG. 1 is a schematic illustrating various aspects of a system, according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes how product information may be displayed via a website to a consumer to increase the likelihood of the consumer purchasing one or more products being displayed and increase a conversion rate of the corresponding webpage. The conversion rate may be indicative of a rate at which a corresponding web page facilitates a user completing a predefined user activity such as, for example, viewing a predefined web page, ordering a product and/or service, and/or performing a predefined user task. Particularly, the present disclosure describes how a system provides a website to a consumer, receives a product search request including a search query from the consumer via a search webpage, determines whether to modify the search query to remove one or more search terms included in the original search query, and generates and displays relevant product information to the consumer based on the modified search request.

The system selects one or more terms included with the search query received from the user and generates an optionalization probability associated with the selected term, and determine whether to remove the selected term from the search query as a function of the optionalization probability to generate more relevant search results and improve the conversion rate of the search results page. In one embodiment, optionalization generally refers to the process of determining how likely each term is optional in search in a given query and the optionalization probability indicates the likelihood that a search query that does not include the selected term will generate more relevant search results, for example, the probability of the selected term being optional in generating search results that are relevant to the consumers requests and in resulting in a conversion of the search results webpage.

In general, the present invention describes a system that is programmed to implement a data driven method to automatically derive optionalization terms based on search logs and product inventory. The system operates to determine an optionalization of search terms to reduce query keywords to achieve better search accuracy. In general, there are two types of terms that may be optional from queries. For example, in known search engines, a big portion of users enter natural language queries which tend to include functional terms that are not useful to produce relevant search results. In some cases, some of these terms can be distractive to relevance and impact search accuracy. Therefore, for certain cases, these terms should be removed from a search query, however, in many other scenarios these terms should be retained to keep to maintain the integrity of the query. For example, "shirts for men" can be safely reduced to "men shirts" for a potentially better search effect, because "for men" could introduce unnecessary mismatches. However, the query "cut the rope" should not be reduced to "cut rope" because the meaning is shifted to a radically different semantic.

One type of terms are those meaningless terms that are used as connectors. These terms typically include conjunctives and articles, e.g. "for", "and", "the", and they often have high frequencies. However, not all occurrences of such conjunctives are meaningless. For example, the word "the" in query phrase "cut the rope" is meaningful as it is a part of a known concept ("cut the rope" is a popular cellphone game). To determine when functional terms, referred to as stopwords, should be removed from the query, the system determines the context of each stopword from product title. The system determines that if a stopword functions as a connection word within a common phrase, it should be retained. Otherwise, if the word introduce a frequent bigram with either the word before it or the word after it, it is deemed a distractive factor and should be removed from the search query. To identify which of these high frequency terms are optionalizable, the system implements an algorithm to scan occurrences of bigrams and trigrams of the terms in inventory data, and determines the optionalization probability based on these information along with other statistics.

Similar to the idea of contextual stopword, not all terms users entered are useful for retrieval and ranking purpose. Depending on the cases, sometimes removing such terms from retrieval will eliminate noisy items, and reducing their weight in ranking could avoid irrelevant items ranking too high. In one embodiment, the system may generalize the term set to consider all possible terms, regardless whether they have practical meaning or not. Because the system may consider a much larger term set, linguistic features are difficult to apply as they are expensive to compute. Heuristic features that apply to stopwords may not apply to general cases. Therefore, the system may rely mostly on statistical signals to build the decision function for determining the optionalization probability of terms.

In addition, the system may identity a second type of optionalizable terms that include those terms that have real meanings, but either their meaning is redundant given other terms in the query, or they are too specific to retrieve any relevant items in the system. To discover such terms, the system implements a data driven method based on user session logs. For example, the system may analyze user query formulation behaviors in search sessions. The system mines legitimate query rewrites that could possibly lead to better performance by omitting certain terms from each query. The system then gathers optionalization frequencies on words, on words conditional on queries and other terms, etc. The system algorithm may combine the signals to form an optionalization probability, which indicates how likely a term is optional from the query. For example, the less optional a term is, the more meaningful it is.

In one embodiment, the system is configured to receive a search query from a user including a plurality of search terms, target and detect keyword(s) that are optional given query context (Optionalization), and improve search accuracy and hence webpage conversion rates by using the detection results. The system may predict the probability a term is optional for eCommerce search be generating query specific term weighting. The system may also make use of inventory information stored in a database and conversion data to remove unnecessary query keywords by utilizing optionalization weights, which results in reduced recall sets and optimize product rankings.

The system may generate an optionalization prediction of functional words such as "the", "a", "for", "in", including constructing a decision function based on features of (query, term) pair, e.g. ("18 bike for boy", "for"), and generating and analyzing indicator features and linguistic features. The indicator features may include determining: 1) if the search query is a phrase query; 2) if whole title match exists; 3) if adjacent word is functional term; and/or 4) if the term is followed by a number. The linguistic features may include determining: 1) a bigram context frequency; 2) a trigram context frequency; and/or 3) a trigram context match.

Figure 6:
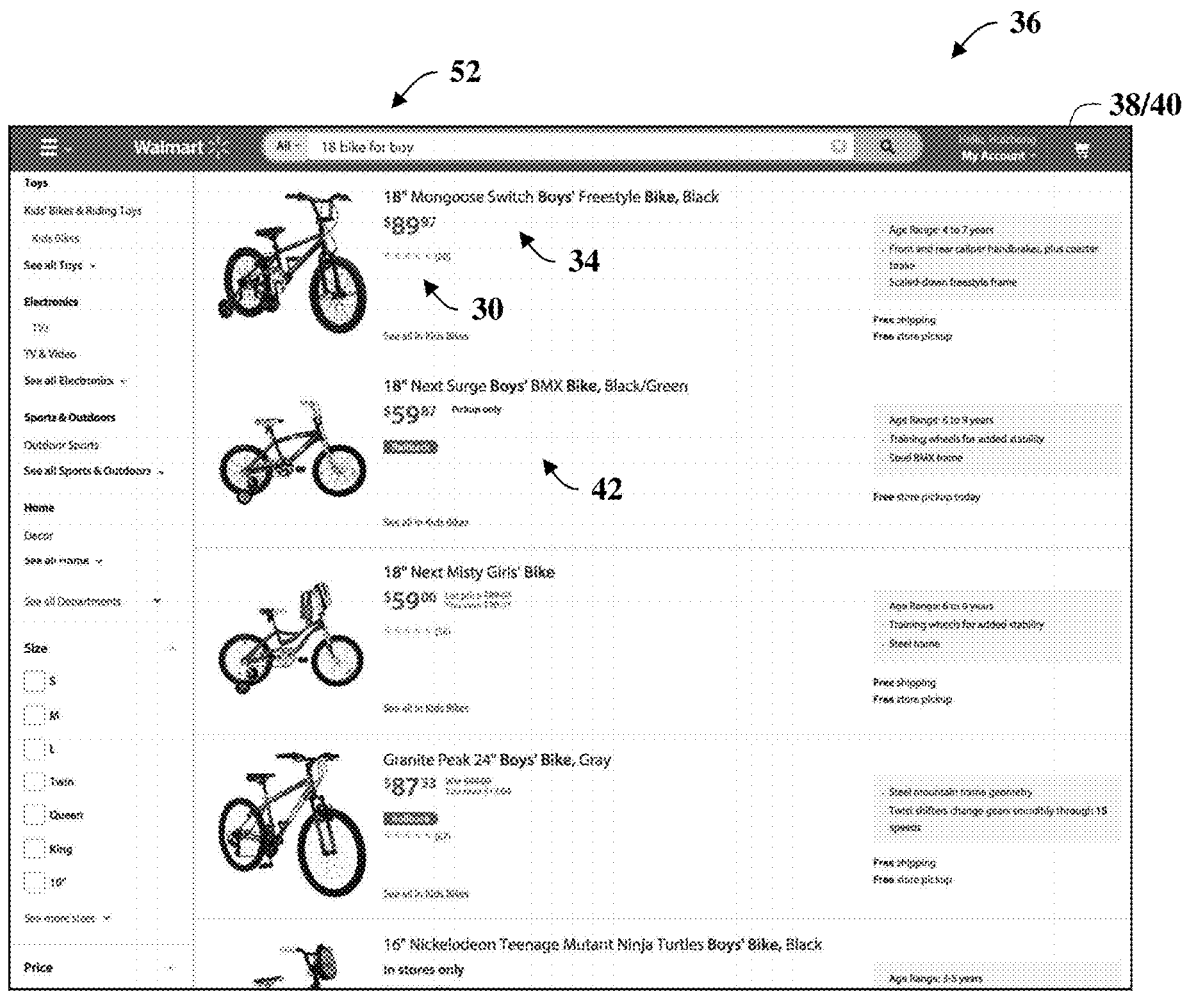
Figure 7:
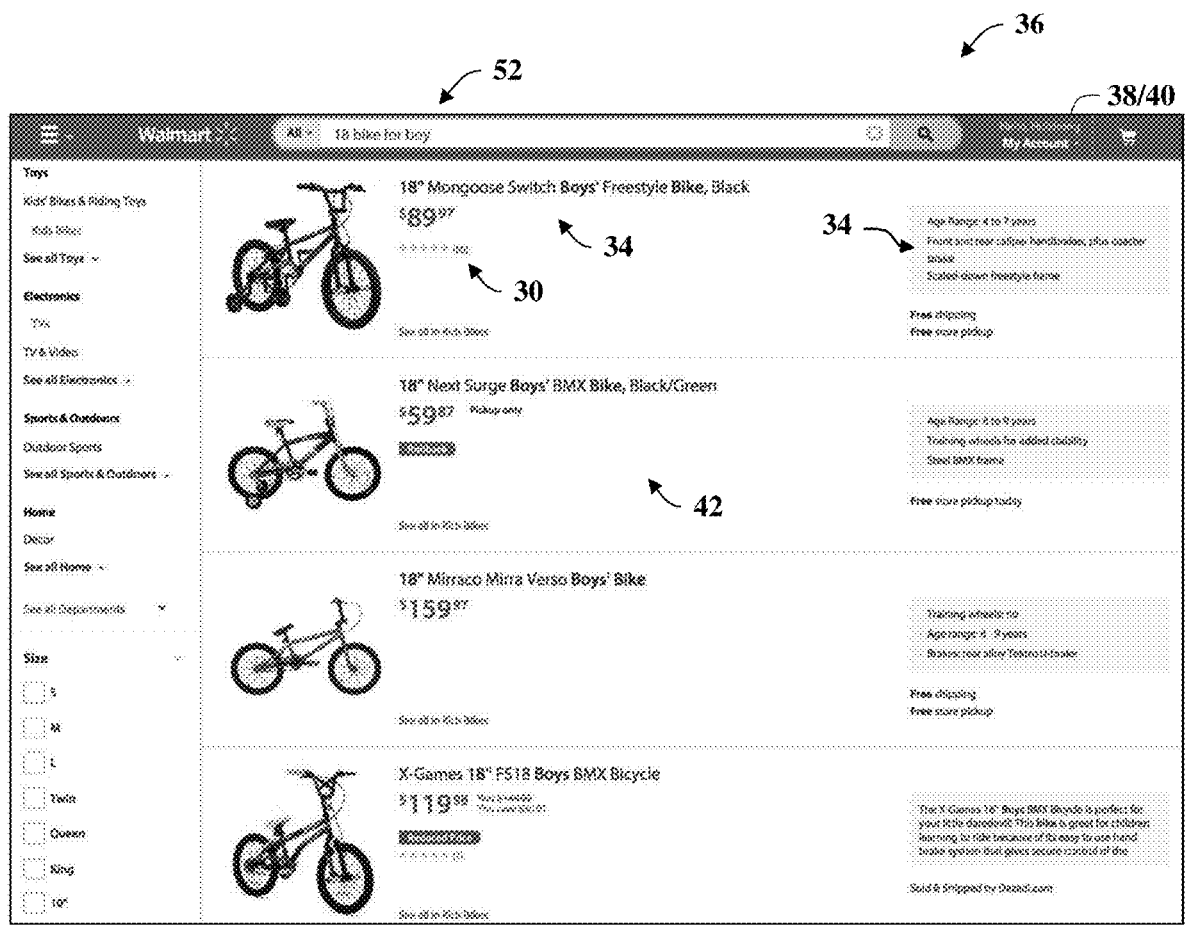

For example, FIG. 6 is an illustration of an exemplary screen shot of a product search result using the search query "18 bike for boy". FIG. 7 is an illustration of an exemplary screen shot of a product search result using the modified search query "18 bike boy". In one embodiment, the system may receive the search query "18 bike for boy" and generate and display search results as shown in FIG. 6. The system retrieves the search results and displays a ranked list of products based on the received query. Moreover, the system may provide an equal weighting to each term included in the received search query "18 bike for boy" and display ranked product lists that may include at least some products that are not as relevant to the consumers request, e.g. an "18 Next Misty Girls' Bike" and a "Granite Peak 24" Boys Bike".

Because the product ranking shown in FIG. 6 includes a product record describing a 'Girls' Bike" and a product record describing a "24 Boys' Bike", the results may not be useful to the consumer.

Referring to FIG. 7, in the illustrated embodiment, the system may select a term within the original search query such as, for example, the stopword "for" and determine an optionalization probability associated with the term "for". In this example, the system may generate and analyzing indicator features and linguistic features associated with the term "for" to determine a corresponding optionalization probability for use in weighting the selected term "for". In the illustrated embodiment, the system may determine the selected term "for" to have a relatively high optionalization probability and associate a relatively low term weight to the term "for" as compared to the other terms in the search query, and conduct a product search with a modified search query that includes a low term weighting for the selected term to generate more relevant search results for the consumer. For example, as shown in FIG. 7, the system conducts a product search using a modified search query "18 bike boy" that does not include the selected term "for", which generates product rankings that are more relevant to the consumer. As shown in FIG. 7, each of the displayed products include the terms "18, "bike", and "boy" in the product description, providing a more relevant product listing to the consumer. In one embodiment, as shown in FIG. 7, the system may not display the modified search term "18 bike body" to the consumer with the corresponding search results. Alternatively, the system may display one or more modified search queries to the user and allow the user to select a modified search query for use in generating the product search.

In one embodiment, a crowdsourcing evaluation of the system using binary decision to reduce search term in which overall 391 queries evaluated produced 41 improved searches and 7 regressed. When evaluating a functional term, the system produced 21 improved searched and 1 regressed. When evaluating any term in the search query, the system produced 20 improved searches and 6 regressed.

In addition, the system may also generate an optionalization prediction of meaningful words by constructing a decision function based on features for any (query, term) pair, e.g. (<"wedding unity candle set", "wedding">, <"wedding unity candle set", "unity">, . . . ) and generating and analyzing statistical features related to the selected word(s). The statistical features may include: 1) IDF; 2) query-term drop probability, conditional probability; 3) term drop probability; 4) average/maximum of term-term drop probability, conditional probability; 5) unique number of queries in which the term is dropped; and/or 6) query conversion rate.

With reference to the FIGS. and in operation, the present invention provides a system 10, methods and computer product media that facilitates displaying product information to a user via a website. Referring to FIG. 1, an exemplary environment in which the system 10 operates is illustrated. In the illustrated embodiment, the system 10 is configured to enable a user to access a website with one or more user computing devices to view information indicative of products that may be purchase by the user via the website. In general, the system 10 displays a product search webpage and receives a search query entered by the user via the webpage. The system selects one or more terms includes in the search query and determines an optionalization probability associated with the selected search term. The system 10 determines whether to retain the selected search term as a function of the optionalization probability and responsively generates a search request, and generates and displays a product search result including information associated with product records that are retrieved as a function of the search request. The system 10 generates the search request including some or all of the terms included in the received search query as a function of the optionalization probability associated with one or more of the search terms. In one embodiment, the system 10 may remove a search term from the search request if the corresponding optionalization probability is greater than or equal to a predefined probability.

By determining optionalization probabilities associated with terms included in user search queries, and removing selected terms from the search requests based on the optionalization probabilities, the system 10 generates and displays search results that are more relevant to the needs of the consumer over known search engines. Thus increasing the likelihood of a consumer purchasing a product displayed in the list and increasing the overall revenue being generated by the website. For example, the system provides relevant product listings without requiring the consumers to input filter queries and/or product categories, thus reducing the effort required by the consumer to retrieve the desired products from the website.

In addition, by generating the improved search requests, the system 10 improves the speed and functionality of known computing systems by reducing the amount of product records being retrieved from a search request and being displayed in response to a user's search request, thus reducing the computing resources required to generate and display relevant search results.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a website hosting server 12, a search engine server 14, a term optionalization server 16, a database server 18, a database 20, and one or more user computing devices 22 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like.

The database server 18 includes a memory device that is connected to the database 20 to retrieve and store information contained in the database 20. The database 20 contains information on a variety of matters, such as, for example, web pages associated with one or more websites, search queries, customer account information, product records, product images, product information, search terms, term frequency records, search query conversion records, session logs, term optionalization records, and/or any suitable information that enables the system 10 to function as described herein. The data and/or records contained in the database 20 may include searchable data terms including characters, symbols, letters, numbers, words, phrases, images, and the like.

Figure 8:
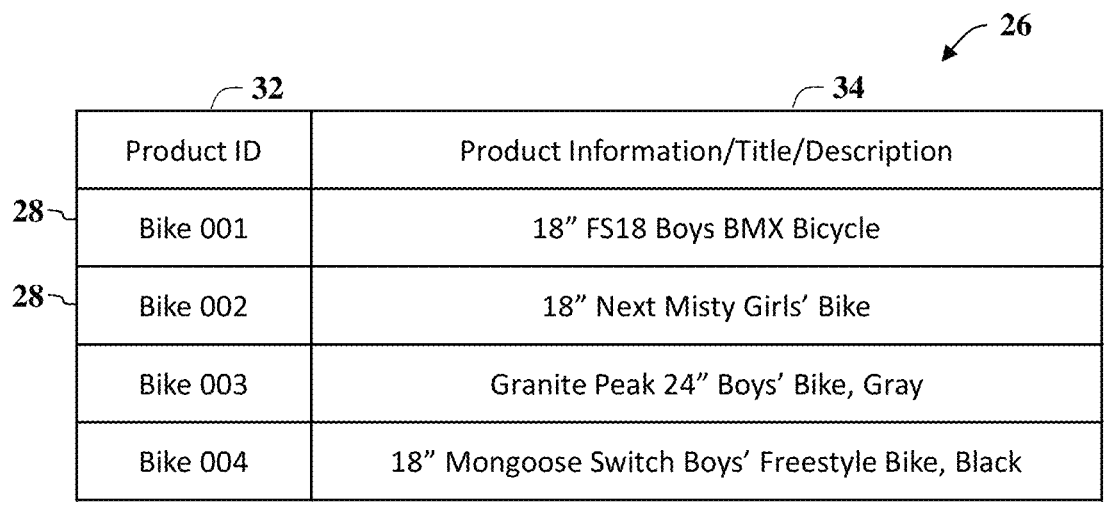

For example, in one embodiment, the database 20 may contain a product record list 26 including a plurality of product records 28 (shown in FIG. 8) associated with a plurality of products 30 (shown in FIGS. 6 and 7). Each product record 28 may include a product identifier 32 and associated product information 34. The product information 34 may include product titles and/or product descriptions associated with the product. The data contained in the product records 28 may include numerical values, image files, and/or textual information. In one embodiment, for example, the product record 28 may include product information 34 including an image file (shown in FIGS. 6 and 7) of the product and a text file for use in displaying a corresponding product information 34 on a webpage.

The database 20 may also include customer account records that include information about consumers including, but not limited to, a unique customer ID, username, password, name, customer address, purchase history, product search history, search query histories, and/or product preferences such as, for example, product category preferences, item attribute preferences, attribute value preferences, and the like. The customer account records may be used to identify a consumer that is accessing the website and determine optionalization probabilities associated with search terms entered by the consumer. For example, in one embodiment, the system 10 may determine an optionalization probability of a search term based on the previous search requests and/or search query histories stored in the corresponding customer account record.

The website hosting server 12 is configured to host a website 36 that is accessible by a user via one or more user computing devices 22. The website hosting server 12 retrieves and stores web pages 38 (shown in FIGS. 6 and 7) associated with one or more websites 36 in response to requests received by the user via the user computing device 22 to allow users to interact with the website and search and/or purchase products such as, for example, goods and/or services via the website. In one embodiment, the website hosting server 12 is configured to generate and display web pages 38 associated with the website in response to requests being received from consumers via corresponding web browsers that are displayed on the user computing devices 22. For example, in one embodiment, the website hosting server 12 may display a product search webpage 40 (shown in FIGS. 6 and 7) in response to receiving a user request that allows a user to input a product search request including search criteria including one or more search terms.

In one embodiment, the website hosting server 12 may allow customers to login and access corresponding customer accounts including account information such as, for example, previous purchase, pending orders, pending deliveries, and/or product preferences. For example, the website hosting server 12 may display a login page (not shown), receive a unique customer ID such as, for example, a username and/or password, and identify the customer account associated with the unique customer ID to enable the identified customer to access information and/or features associated with the corresponding customer account. In addition, the website hosting server 12 may transmit the product search request to the search engine server 14 and/or the term optionalization server 16 for use in generating search data and/or product lists in response to the user's search request. The website hosting server 12 may also receive one or more product lists 42 (shown in FIGS. 6 and 7) from the search engine server 14 and/or the term optionalization server 16 that includes information associated with products that are selected based on the user's search criteria. The website hosting server 12 may also display a search results webpage 40 to display the product list 42 to the user and to allow the user to select one or more of the displayed products for purchase.

Figure 9:
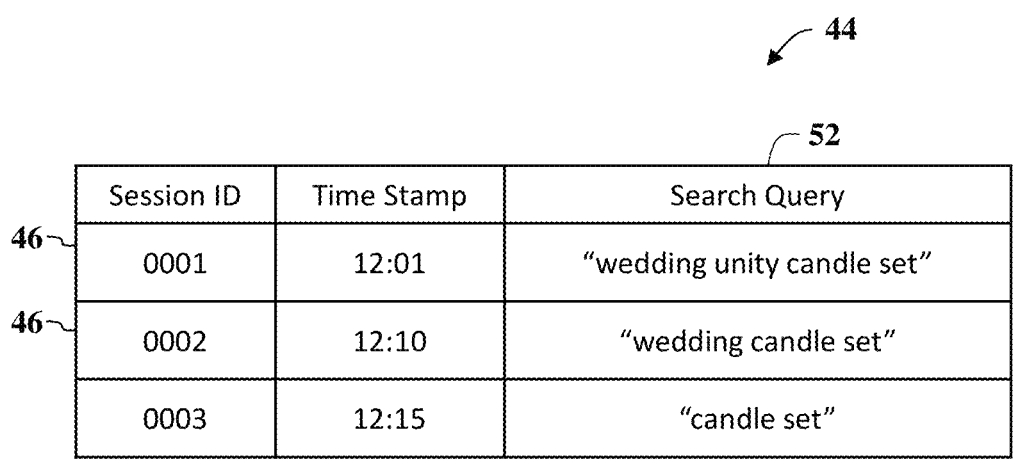

In one embodiment, as shown in FIG. 9, the website hosting server 12 may generate and store an activity session list 44 in the database 20 including one or more activity session records 46 associated with consumer activity associated with a search webpage. For example, in one embodiment, each activity session record 46, e.g. session log, may include a plurality of data categories that each includes information associated the corresponding web page being accessed by the user. For example, in one embodiment, an activity session record 46 may include a web browser ID, a timestamp ID, a webpage ID, a session ID, and/or a corresponding search query.

In addition, the website hosting server 12 may generate and store a search query conversion list 48 (shown in FIG. 10) that includes a plurality of conversion records 50 associated with search queries that are received via the product search webpage 40. For example, on one embodiment, the website hosting server 12 may receive a search query 52 from a user via the product search webpage 40, generate and display a product list 42 in response to the search query 52, and determine whether the displayed product search webpage 40 resulted in a product purchase and/or other predefined user activity. The website hosting server 12 may generate and/or identify a corresponding conversion record 50 that includes the received search query 52, and modifies and/or generates the corresponding conversion rate associated with the search query 52.

In the illustrated embodiment, the search engine server 14 is configured to receive a product search request from the search term optionalization server 16 including one or more search terms, and generate search data including a plurality of product records as a function of the search terms. For example, in one embodiment, the search engine server 14 may initiate a search algorithm based on a Boolean model to search product records contained in the database 20 based search terms received from the user. The search engine server 14 may generate search data including product records 28 matching the search criteria, and generate a relevance score associated with each product record 28 included in the search data. In one embodiment, the relevance score may be determined based on statistical information, including, but not limited to the number of product records in the database, the frequency in which the search terms appear in the database, and the frequency in which the search term appears in the product record. The relevance of a returned search record may be determined based on the corresponding relevance score and the relevance scores of the other product records in the search data, wherein product records 28 having a higher relevance scores are more relevant to the search criteria. For example, in one embodiment, the product records may include a product description, item attribute, and/or item attribute values that include one or more terms associated with the corresponding product. The search engine server 14 may generate a relevance score associated with the product record as a function of the number of terms included in the product description that match the search terms included with product search request. In addition, the relevance score may be determined within a range between about 0.01 to 1.0, with a relevance score of 1.0 being indicative of the most relevant product record. Many variations to the above described method of determining a relevance score associated with a search request fall within the scope of the present invention.

In the illustrated embodiment, the search engine server 14 generates a product lists 42 as a function of the relevance scores associated with each product record 28 and transmits the product lists 42 to the website hosting server 12 for use in displaying the product lists 42 to the user via one or more search results webpages 40.

In the illustrated embodiment, the term optionalization server 16 receives the search query 52 including a plurality of search terms, selects a search term 54 from the plurality of search terms, and determines an optionalization probability 56 associated with the selected search term 54 (shown in FIG. 12). The term optionalization server 16 determines whether to retain the selected search term as a function of the optionalization probability 56 and responsively generates a search request including some or all of the terms included in the search query, and transmits the search request to the search engine server 14 for use in generating and displaying the search results. In one embodiment, the term optionalization server 16 may remove the selected search term 54 from the received search query 52 and generate a modified search query that does not include the selected search term 54, and transmits the search request including the modified search query to the search engine server 14 for use in generating the search results.

For example, in one embodiment, the user may input a search query including the phrase "18 bike for boy". The term optionalization server 16 may select the term "for" from the search query and determine an optionalization probability associated with the term "for", and remove the term "for" from the search request based on the associated optionalization probability. The term optionalization server 16 may generate a modified search query including the terms "18 bike boy", and transmit the search request, including the modified search query "18 bike boy" to the search engine server 14 for use in generating the search results based on the modified search query. In one embodiment, the term optionalization server 16 may generate the modified search query with the search request including removing the selected term from the search query if the optionalization probability is greater than a predefined probability. In addition, the term optionalization server 16 may also associate a term weighing to the selected term based on the optionalization probability. The search engine server 14 may use the associated term weighting in generating the search data, and determine corresponding relevancy score of the search data based on the corresponding term weighing. For example, in one embodiment, the term optionalization server 16 may associated a low term weighting to the selected term if the optionalization probability is above a predefined probability. The search engine server 14 may receive the search request from the term optionalization server 16, including the associated term weighing, and general search data as a function of the term weighting. For example, the search engine server 14 may associated a lower relevance score to product records that include the selected term as a function of the associated term weighting.

In one embodiment, the term optionalization server 16 may analyze a product record list 26 including a plurality of product records 28 included in the database 20 and determine a number of product records 28 having product information matching the search query 52, and determine the optionalization probability as a function of the number of matching product records. For example, the term optionalization server 16 may assign a relatively low optionalization probability to a selected term 54 if a predefined number of product records 28 are identified that have product information that matches the search query, which may indicate that a more relevant product search may be conducted using a search query that includes the selected term.

The term optionalization server 16 may also generate and stores a term optionalization list 58 including term optionalization records 60 (shown in FIG. 12) in the database 20. Each term optionalization record 60 includes a search query term pair, (search query, term). Each term optionalization records 60 includes the determined optionalization probability associated with the corresponding selected term 54 and search query term pair. The term optionalization server 16 may also select terms from the search query that are included in a predefined set of terms. For example, in one embodiment, the term optionalization server 16 may select terms that are included in a predefined set of stopwords that include function terms such as, for example, the terms "the", "a", "for", "in". The term optionalization server 16 may also determine if an adjacent term in the search query 52 is included in the predefined set of terms and generate the search request including the selected word being retained in the search query upon determining the adjacent term is included in the predefined set of terms.

In one embodiment, the term optionalization server 16 may select one or more bigrams 62 (e.g. two-word combinations of adjacent terms) within the search query including the selected term 54, determine a bigram frequency 64 of the bigram appearing in the product records 28, and determine the optionalization probability 56 associated with the selected term 54 as a function of the bigram frequency. For example, the term optionalization server 16 may select a bigram including the selected term and analyze the product records 28 included in the database 20 to determine a number of product records 28 that include product information having text that matches the term bigram 62. For example, as shown in FIG. 7, the user may submit a search query including the phrase "18 bike for boy". The term optionalization server 16 may select the term "for", and determine an optionalization probability associated with the term "for". The term optionalization server 16 may select the bigrams "bike for" and "for boy", and analyze the product records 28 to determine a frequency at which each bigram appears in the product records. In addition, the term optionalization server 16 may generate and store a term frequency list 66 (shown in FIG. 11) including the search query 52, the selected term 54, the corresponding bigrams 62, and the corresponding bigram frequencies 64 associated with each bigram 62. Moreover, the term optionalization server 16 determines an optionalization probability associated with the selected term 54 as a function of the bigram frequencies 64. For example, in one embodiment, the term optionalization server 16 may determine that a search term having a relatively high bigram frequency may also have a relatively high optionalization probability as compared to other terms included in the search query, which would indicate that more relevant search results may be obtained using a modified search query that does not include the selected term.

The term optionalization server 16 may also select one or more trigrams 68 (e.g. three-word combination of adjacent terms) within the search query including the selected term 54, determine a trigram frequency 70 of the trigram appearing in the product records 28, and determine the optionalization probability 56 associated with the selected term 54 as a function of the trigram frequency 70. For example, as shown in FIG. 11, the term optionalization server 16 may select "18 bike for" and "bike for boy", as the trigrams being analyzed for the selected search term "for". The term optionalization server 16 reviews the product records 28 to determiner a frequency at which the selected trigram 68 appears in the product information included in the product records 28. The term optionalization server 16 determines an optionalization probability associated with the selected term 54 as a function of the trigram frequencies 70. In addition, the term optionalization server 16 may also modify the term frequency list 66 to include the determined trigram frequencies associated with the corresponding search term 54. For example, in one embodiment, the term optionalization server 16 may determine that a search term having a relatively high trigram frequency may also have a relatively low optionalization probability indicating that a more relevant search result may be generated if the search request included the selected term.

The term optionalization server 16 may also determine a number of product records 28 having product information 34 matching the selected trigram 68, and determine the corresponding optionalization probability associated with selected term 54 as a function of the number of matching product titles.

In one embodiment, the term optionalization server 16 may be programmed to iterate each term 54 included in a search query over all product records 28. Alternatively, the term optionalization server 16 may select terms included in a predefined set of terms such as, for example, a list of stopwords, and iterate each term included in the predefined list over all product records and/or product titles. For example, whenever the term optionalization server 16 identifies a product title match to a stopword, the optionalization server 16 may accumulate the bigram count, trigram count and title count for the stopword, using the adjacent words.

The term optionalization server 16 may also access the session list 44 and iterate over all unique search queries included in the session list 44 within a recent period. In addition, the term optionalization server 16 may determine if one or more conditions are present within the session list 44 related to the received search query and determine whether to remove a selected term based on a predefined set of rules.

For example, in one embodiment, the term optionalization server 16 may determine if the search query: 1) has more than two terms; 2) if the search query frequency passes a threshold (this is to avoid handling misspelled queries); and 3) if the search query contains at least one stopword. If these conditions are met, the term optionalization server 16 may review all stopwords that appear in the query to determine whether to retain the corresponding stopwords in the search request. In one embodiment, the term optionalization server 16 may determine whether to remove each of the stopwords utilizing an optionalization algorithm using the following rules: a.) if query is a phrase query, retain all words; b.) if entire query has a product title match, retain all words; c.) if adjacent word is also stopword, retain both words; d.) if word is "in" following a number, retain the word; e.) if trigram context has a title match, retain the word; f.) if trigram context pass predefined threshold, retain the word; g.) otherwise to all cases, if bigramSupport>max(10, 5*trigramSupport), remove the word; and h.) if the word to be removed is "for" and it's the only stopword, flip the before and after parts of the query. In one embodiment, the term optionalization server 16 executes the optionalization algorithm offline. In addition, online determinations of whether to remove terms may be performed by a direct look up into the corresponding signal, for example, using the term frequency lists 66.

In addition, the term optionalization server 16 may determine a conversion rate associated with each search query and use the conversion rate to further examine if a rewrite will provide more relevant search results.

In one embodiment, the term optionalization server 16 may generate statistical signals to build the decision function for determining the optionalization probability of search terms.

For example, the term optionalization server 16 may construct a decision function for the query, term pair, e.g. <q, t> pair, which produces the optionalization scores for the term, t, of the given query, q. In one embodiment, the term optionalization server 16 may be programmed to generate the following features: 1.) Inverse Document Frequency (IDF): same as traditional term weighting function, this is to measure how much information a term provides; 2.) Queryterm drop frequency: the raw frequency of observing term t dropped from query q in user issued reformulation in session logs; 3.) Conditional term dropping probability: the probability that a term is dropped given the user issued the query; 4.) Term drop frequency: number of times term t is dropped from any query; 5.) Termterm drop frequency: number of times to observe term t drop given the context of t': given query q, compute average and max of termterm drop frequency for all context terms other than t; 6.) Conditional termterm drop probability: the probability a term is dropped given the context of another term: given query, compute the average and max; 7.) Unique number of queries in which term is dropped; and/or 8.) Query conversion improvement, measure by comparing the original query with the new query with term t dropped.

The term optionalization server 16 may also be programmed to generate a second decision function to build and to produce one single optional term for retrieval, with inputs including optionalization scores for each term in the query, and outputs including an optional term for retrieval/NULL. In addition, the term optionalization server 16 may also generate a ranking of each search term and/or search query in which, for ranking, the optionalization scores are used directly/indirectly for term weighting.

In one embodiment, the term optionalization server 16 may also be programmed to access the activity session list 44 being stored in the database 20 and identify session logs 46 having corresponding search queries that match the received search query 52, determine a number of subsequent session logs 46 including reformulated search queries that remove the selected term, and determine the optionalization probability as a function of the number of reformulated search queries. In addition, the term optionalization server 16 may access the search query conversion list 48 being stored in the database 20 and determine an average conversion rate associated with the search query 52 and/or an average conversion rate associated with the matched session logs. The term optionalization server 16 may also determine the optionalization probability as a function of the average conversion rate.

The term optionalization server 16 may also be programmed to remove the selected term from the search query to generate a modified search query, access the activity session list 44 and determine the number of session logs having corresponded queries matching the modified search query, and determine the optionalization probability 56 associated with the selected term 54 as a function of the number of matching session logs.

Figure 2:
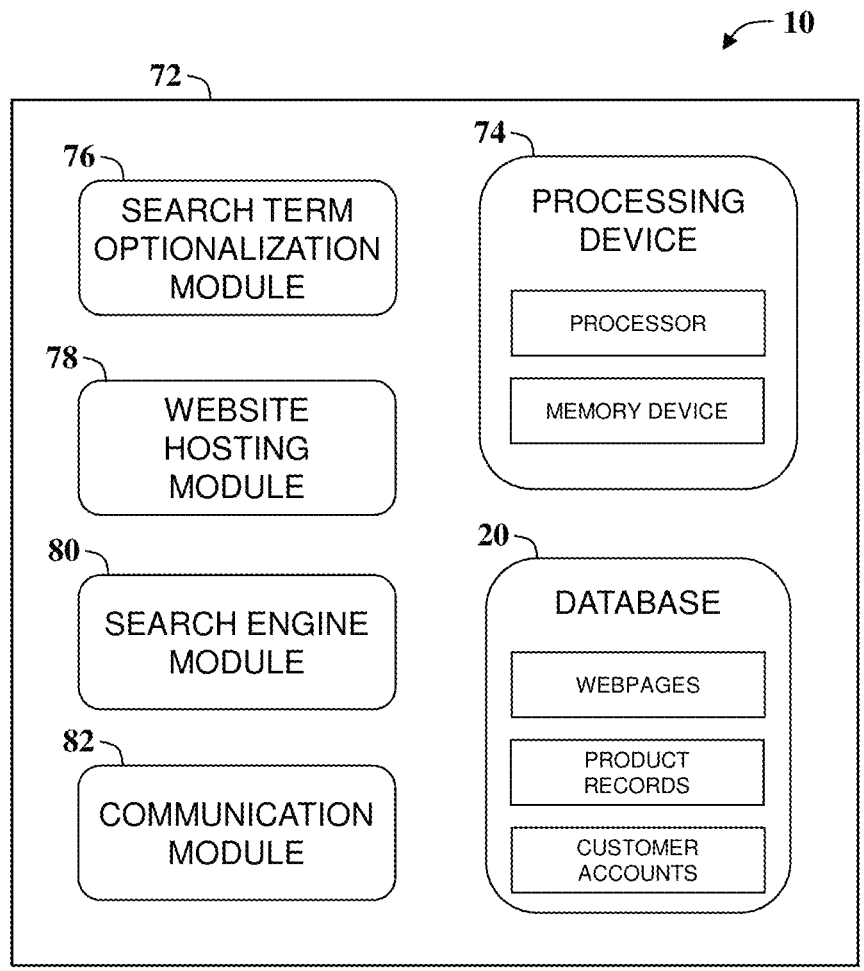
FIG. 2 is a schematic illustrating example components of a server, according to an embodiment of the present invention.

Referring to FIG. 2, in one embodiment, the system 10 may include a system server 72 that is configured to perform the functions of the website hosting server 12, the search engine server 14, the term optionalization server 16, and the database server 18. In the illustrated embodiment, the system server 72 includes a processing device 74 and the database 20.

The processing device 74 executes various programs, and thereby controls components of the system server 72 according to user instructions received from the user computing device 22. The processing device 74 may include memory, e.g., read only memory (ROM) and random access memory (RAM), storing processor-executable instructions and one or more processors that execute the processor-executable instructions. In embodiments where the processing device 74 includes two or more processors, the processors can operate in a parallel or distributed manner. In an example, the processing device 74 may execute a search term optionalization module 76, a website hosting module 78, and a search engine module 80, and a communications module 82.

The processing device 74 may also include a memory device for storing programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications module 82 retrieves various data and information from the database 20 and sends information to the user computing device 22 via the communications network 24 to enable the user to access and interact with the system 10. In one embodiment, the communications module 82 displays various images on a graphical interface of the user computing device 22 preferably by using computer graphics and image data stored in the database 20 including, but not limited to, web pages, product records, sorted groups, product lists, and/or any suitable information and/or images that enable the system 10 to function as described herein.

The website hosting module 78 may be programmed to perform some or all of the functions of the website hosting server 12 including hosting various web pages associated with one or more websites that are stored in the database 20 and that are accessible to the user via the user computing device 22. The website hosting module 78 may be programmed to generate and display web pages associated with a website in response to requests being received from users via corresponding web browsers.

The search engine module 80 may be programmed to perform some or all of the functions of the search engine server 14 including generating and storing search data in response to the user's product search request. In addition, the search engine module 80 may also be programmed to generate a relevance score associated with each of the product records 28 included in the search data.

The search term optionalization module 76 may be programmed to perform some or all of the functions of the term optionalization server 16 including receiving a search query from the website hosting module 78 including a plurality of search terms, selecting a search term from the search query, and determining an optionalization probability associated with the selected search term. The search term optionalization module 76 also determines whether to retain the selected search term as a function of the optionalization probability and responsively generates a search request including some or all of the terms included in the search query, and transmits the search request to the search engine module 80 for use in generating and displaying the search results.

Figure 3:
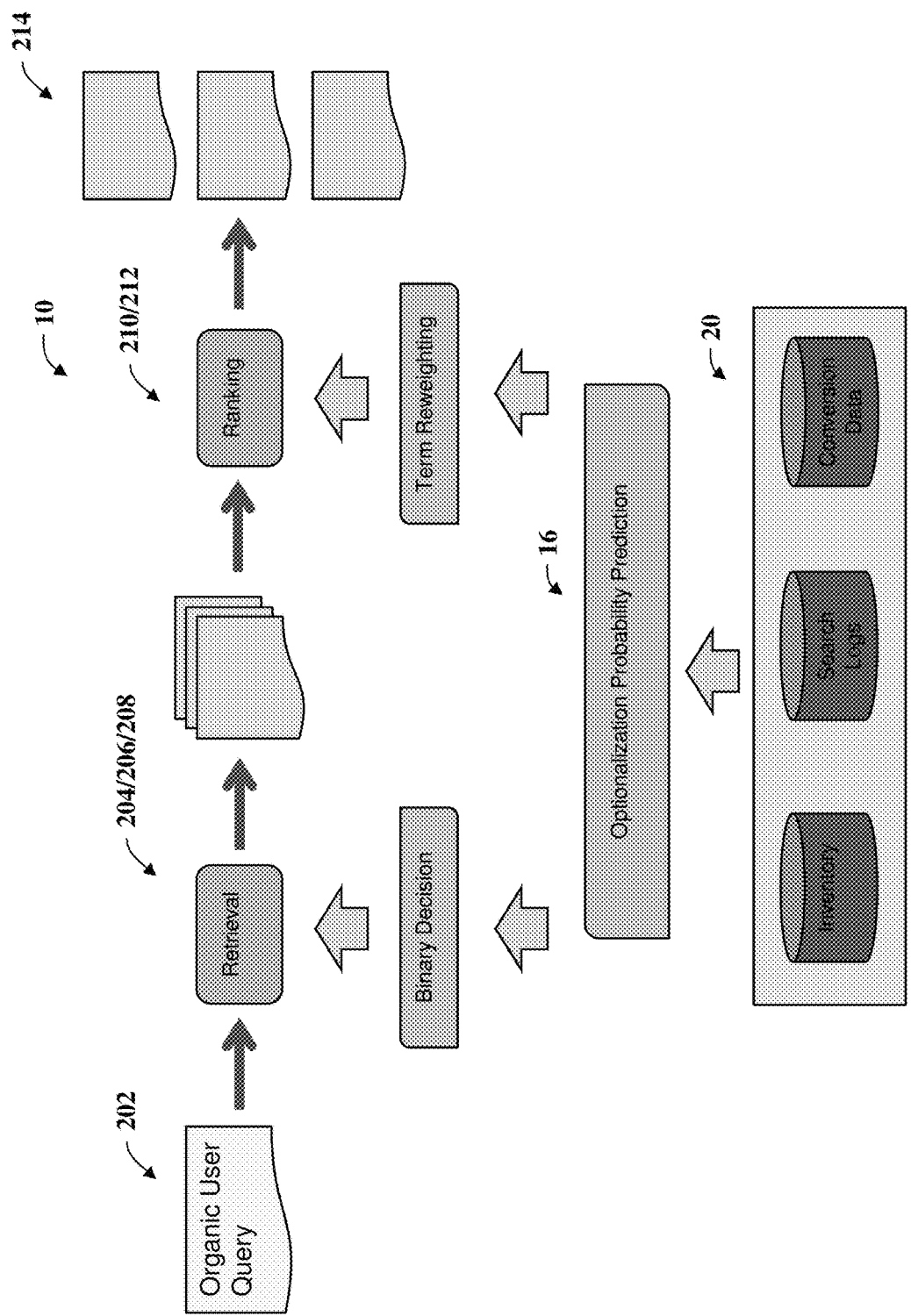
FIG. 3 is a flowchart of a method that may be used with the system shown in FIG. 1, according to an embodiment of the present invention.
Figure 4:
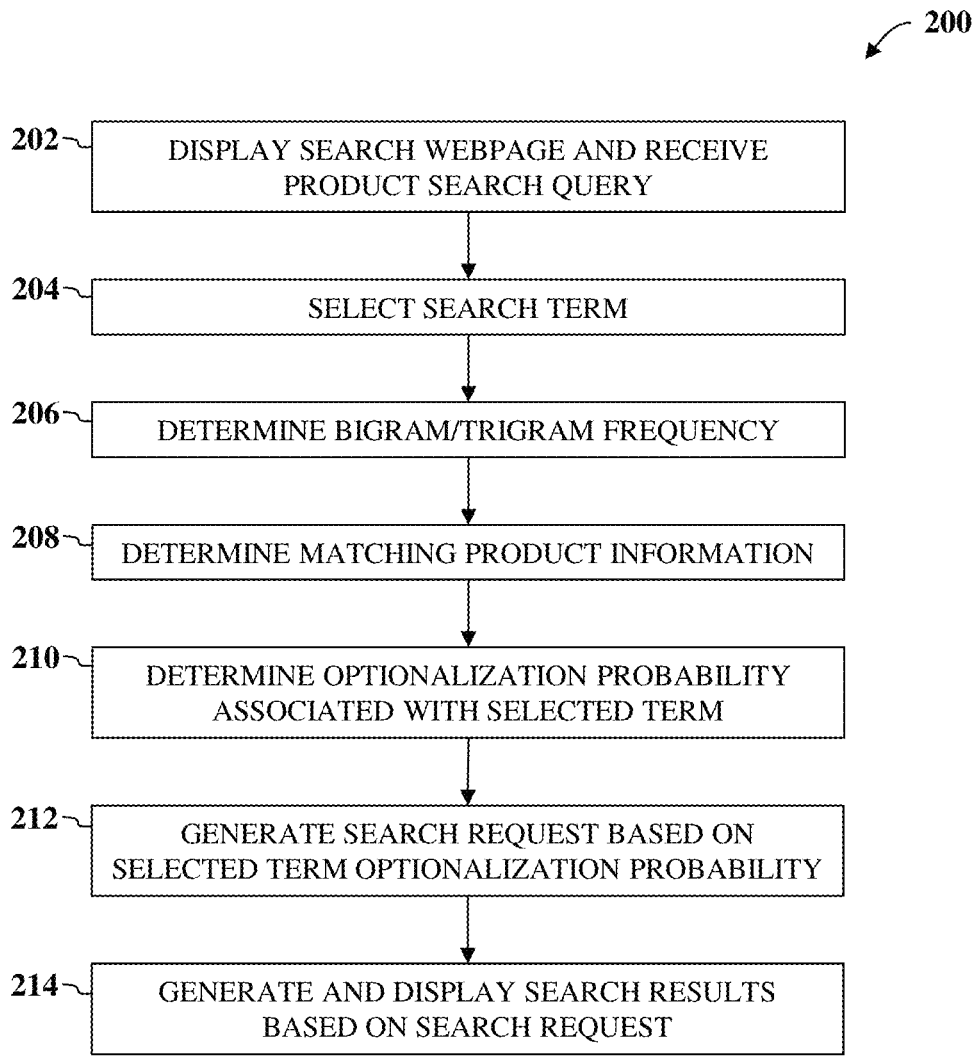
FIG. 4 is a flowchart of a method that may be used with the system shown in FIG. 1, according to an embodiment of the present invention.
Figure 5:
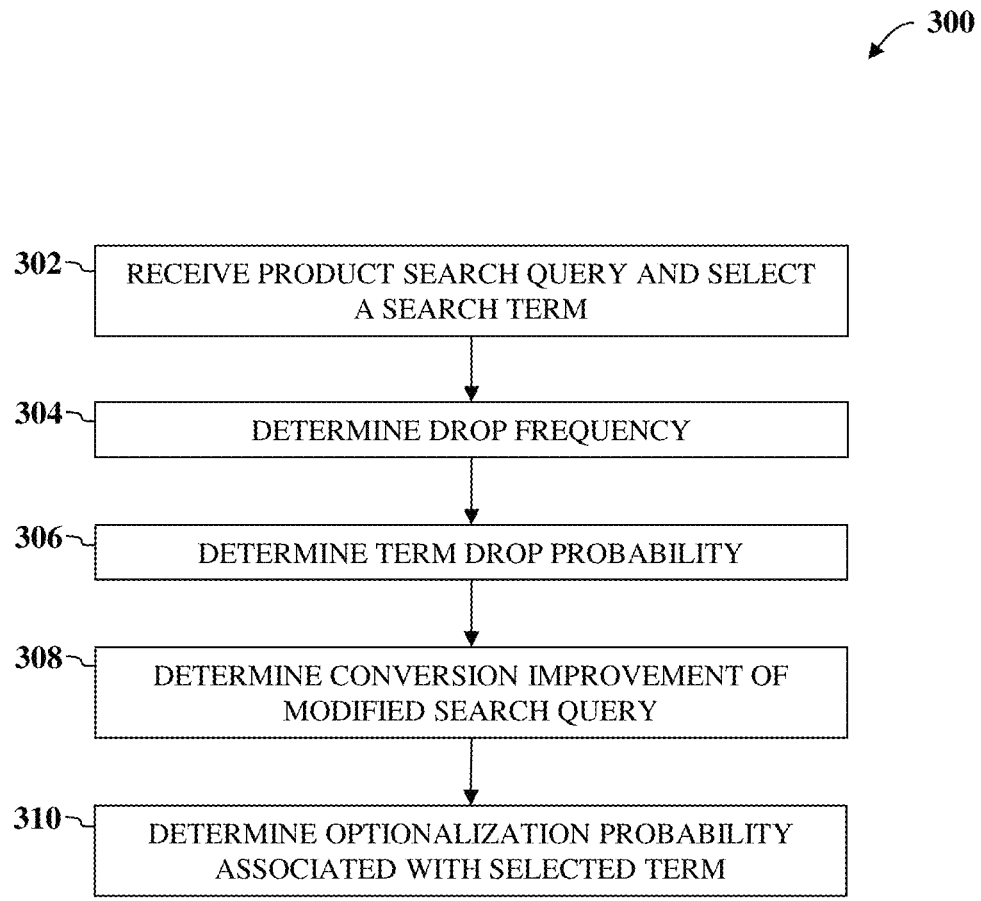
FIG. 5 is a flowchart of a method that may be used with the system shown in FIG. 1, according to an embodiment of the present invention.

FIGS. 3, 4, and 5 are flowcharts of methods 200 and 300 that may be used with the system 10 for displaying product information on a website. The methods include a plurality of steps. Each method step may be performed independently of, or in combination with, other method steps. Portions of the methods may be performed by any one of, or any combination of, the components of the system 10. FIGS. 6-12 are exemplary graphical displays that may be displayed by the system 10.

In the illustrated embodiment, in method step 202, the website hosting server 12 receives a request from one or more user computing devices 22 to display one or more web pages 38 associated with a website hosted by the system 10, and retrieves and displays the requested web pages 38 on a corresponding user computing device 22. In one embodiment, the website may include an e-commerce website that enables a consumer to view and purchase and/or order various goods and services from one or more merchants via the website. In other embodiments, the website may be a search engine website, an informational website, a blog, a company website, a forum website, a file-sharing website, a social-networking website, and/or any suitable type of website that may be accessed by a user.

In the illustrated embodiment, the website hosting server 12 displays a search webpage 40 that allows users to enter search criteria associated with products that are available for purchase via the website 36. The website hosting server 12 also receives a product search request including a search query from the user via the search webpage 40. For example, as shown in FIG. 7, the website hosting server 12 may receive the search query "18 bike for boy".

In method step 204, the term optionalization server 16 selects a term included in the search query for use in generating a corresponding optionalization probability to determine whether the selected search term should be removed from the received search query to facility improving the search results. In one embodiment, the term optionalization server 16 may determine if each term included in the received search query is included in a predefined set of terms such as, for example a list of stopwords, selects each term that is included in the predefined set, and generated optionalization probabilities for each selected term. In another embodiment, the term optionalization server 16 may generate a corresponding optionalization probability for each term included in the search query. For example, in one embodiment, the term optionalization server 16 may receive the search query "18 bike for boy" and select the functional term "for" for analysis.

In method step 206, the term optionalization server 16 identifies bigrams and/or trigrams from the search query that include the selected term and generate bigram and trigram frequencies. For example, for each identified bigram and trigram, the term optionalization server 16 may access the product record list 26 to determine the frequency at which the corresponding bigram and/or trigram appears in the product records. In one embodiment, the term optionalization server 16 may receive a product search result from the search engine module 80 that is based on the received search query, and analyze the received product search result data to determine the frequency at which the corresponding bigram and/or trigram appears in the received product search result data.

In method step 208, the term optionalization server 16 determines if and product records include product information that matches the search query, the identified bigrams, and/or the identified trigrams.

In method step 210, the term optionalization server 16 determines an optionalization probability associated with the selected term as a function of the bigram frequencies, trigram frequencies, and/or the number of matching product records. For example, in one embodiment, the term optionalization server 16 may associate a high optionalization probability with the selected term if selected term includes relatively large bigram frequencies. In addition, the term optionalization server 16 may associate a low optionalization probability with the selected term if the selected term has a large number of product record matches.

In method step 212, the term optionalization server 16 determines whether the selected term should be removed from the search query based on the corresponding optionalization probability and generates a search request based on the selected term optionalization probability. In one embodiment, the term optionalization server 16 may remove the selected term from the search query if the term optionalization probability is greater than or equal to a predefined probability value, and generate a search request including a modified search query that does not include the selected term.

In method step 214, the term optionalization server 16 transmits the search request to the search engine server 14 for use in generating and displaying product search results based on the search request. For example, as shown in FIG. 7, the term optionalization server 16 may receive the search query "18 bike for boy", select the functional term "for", determine the optionalization probability associated with the selected term "for", and determine to remove the term "for" based on the determined optionalization probability and generate a modified search query including "18 bike boy". The term optionalization server 16 may also transmit the modified search query "18 bike boy" to the search engine server 14 for use in generating the search results displayed in the FIG. 7. As shown in FIG. 7, in one embodiment, the system 10 does not display the modified search term "18 bike body" to the consumer with the corresponding search results. In another embodiment, the system 10 may display one or more modified search queries to the user and allow the user to select a modified search query for use in generating the product search.

In one embodiment, the system 10 may be programmed to implement method 300. In method step 302, the term optionalization server 16 receives the product search query from the user and selects one or more terms that are included in the search query.

In method step 304, the term optionalization server 16 accesses the activity session list included in the database and determines matching session records including the search query. The term optionalization server 16 also analyzes the subsequent session records to determine a term drop frequency that indicates the frequency at which a user requested a subsequent search query that did not include the selected term. In method step 306, the term optionalization server 16 determines a term drop probability based on the drop frequency associated with the selected term.

In method step 308, the term optionalization server 16 accesses the search query conversion list and determines a conversion improvement associated with a modified search query that does not include the selected term. For example, the term optionalization server 16 identifies a conversion record 50 that matches the modified search query and determines an average conversion rate associated with the modified search query.

In method step 310, the term optionalization server 16 determines the optionalization probability associated with the selected term based on the term drop frequency, the term drop probability, and/or the conversion improvement.

In general, the system 10 is configured to display product information to a consumer to increase the likelihood of the consumer purchasing one or more products being displayed and increase a conversion rate of the corresponding webpage. The system provides a website to a consumer, receives a product search request including a search query from the consumer via a search webpage, determines whether to modify the search query to remove one or more search terms included in the original search query, and generates and displays relevant product information to the consumer based on the modified search request. Moreover, the system selects one or more terms included with the search query received from the user and generates an optionalization probability associated with the selected term, and determine whether to remove the selected term from the search query as a function of the optionalization probability to generate more relevant search results and improve the conversion rate of the search results page.

By determining optionalization probabilities associated with terms included in user search queries, and removing selected terms from the search requests based on the optionalization probabilities, the system generates and displays search results that are more relevant to the needs of the consumer over known search engines. Thus increasing the likelihood of a consumer purchasing a product displayed in the list and increasing the overall revenue being generated by the website.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system for displaying product information to a customer, comprising:
a database comprising:
a plurality of product records including product information associated with a plurality of products and a plurality of session logs, wherein the plurality of session logs comprise a plurality of search queries that match corresponding session logs of the plurality of session logs, wherein the plurality of session logs comprise a plurality of product categories associated with a plurality of web pages;
a search query conversion list comprising a plurality of conversion records associated with the plurality of session logs; and
a term optionalization list comprising one or more term optionalization records, wherein each optionalization record of the term optionalization list comprises (i) a respective search query term pair and (ii) a respective predetermined optionalization probability, wherein the respective search query term pair comprises a respective search query and a respective search term of the respective search query, and wherein an optionalization prediction of one or more functional words within the respective search query of the respective search query term pair is generated by a decision function based on (i) at least one or more features of the respective search query term pair and (ii) one or more indicator features of the respective search query of the respective search query term pair; and
a server including a processor programmed to perform:
receiving a search query including a plurality of search terms, the search query being received from a user via a user computing device;
selecting a search term from the plurality of search terms from the search query;
when the search query and the search term match the respective search query term pair for one of the one or more term optionalization records in the term optionalization list:
determining an optionalization probability based on the respective predetermined optionalization probability associated with the one of the one or more term optionalization records;
when the search query and the search term do not match the respective search query term pair for any of the one or more term optionalization records in the term optionalization list:
selecting a session log from the plurality of session logs;
generating an average conversion rate associated with the search query conversion list associated with the plurality of session logs, as matched; and
generating the optionalization probability associated with the search term, as selected, wherein the optionalization probability is a function of the average conversion rate and represents a likelihood that the search term from the search query is an optional search term;
determining whether to retain the search term, as selected, within the search query, as a function of the optionalization probability, wherein the search term from the search query is retained when the optionalization probability for the search term is less than a predefined probability given a context of the search query;
generating a search request as a function of the search query, wherein the search request includes or does not include the search term, as selected, based on the determining whether the search term, as selected, is retained or not retained, respectively;
retrieving product records of the plurality of product records from the database as a function of the search request; and
transmitting instructions to generate and display a product search result including product information associated with the product records, as retrieved, based on the optionalization probability associated with (a) the search term, as selected, or (b) the average conversion rate.

2. The system in accordance with claim 1, wherein the processor is further programmed to perform:
generating a modified search query with the search request including removing the search term, as selected, from the search query when the optionalization probability is greater than a predefined probability.

3. The system in accordance with claim 1, wherein the processor is further configured to perform:
selecting a bigram within the search query including the search term, as selected; and determining a bigram frequency of the bigram appearing in the plurality of product records, wherein the optionalization probability is a function of the bigram frequency.

4. The system in accordance with claim 1, wherein the processor is further configured to perform:
selecting a trigram within the search query including the search term, as selected; and
determining a trigram frequency of the trigram appearing in the plurality of product records, wherein the optionalization probability is a function of the trigram frequency.

5. The system in accordance with claim 4, wherein the processor is further programmed to perform:
determining a number of product records of the plurality of product records having product information matching the trigram, as selected; and
determining the optionalization probability as a function of the average conversion rate and a number of matching product titles.

6. The system in accordance with claim 1, wherein the processor is further programmed to:
determining a number of product records of the plurality of product records having product information matching the search query, wherein the optionalization probability is a function of the number of product records.

7. The system in accordance with claim 1, wherein the processor is further programmed to perform:
determining whether an adjacent term in the search query is included in a predefined set of terms, wherein the search request includes a word being retained in the search query upon determining the adjacent term is included in the predefined set of terms.

8. The system in accordance with claim 1, wherein the processor is further programmed to perform:
identifying session logs of the plurality of session logs having corresponding search queries matching the search query, as received; and
determining a number of subsequent session logs including reformulated search queries that remove the search term, as selected, wherein the optionalization probability is a function of the average conversion rate and a number of reformulated search queries.

9. The system in accordance with claim 8, wherein the processor is further programmed to perform:
removing the search term, as selected, from the search query to generate a modified search query; and
determining a number of session logs of the plurality of session logs having corresponding search queries matching the modified search query, wherein the optionalization probability is a function of the average conversion rate and the number of session logs.

10. The system in accordance with claim 8, wherein the processor is further programmed to:
generating a conversion record of the plurality of conversion records.

11. A method for displaying product information to a customer, including:
storing in a database, via a computing system using one or more processors, a plurality of product records including product information associated with a plurality of products and a plurality of session logs, wherein the plurality of session logs comprise a plurality of search queries that match corresponding session logs of the plurality of session logs, and wherein the plurality of session logs comprise a plurality of product categories associated with a plurality of web pages;
storing in the database, via the computing system using the one or more processors, a search query conversion list comprising a plurality of conversion records associated with the plurality of session logs;
storing in the database, via the computing system using the one or more processors, a term optionalization list comprising one or more term optionalization records, wherein each optionalization record of the term optionalization list comprises (i) a respective search query term pair and (ii) a respective predetermined optionalization probability, wherein the respective search query term pair comprises a respective search query and a respective search term of the respective search query, and wherein an optionalization prediction of one or more functional words within the respective search query of the respective search query term pair is generated by a decision function based on (i) at least one or more features of the respective search query term pair and (ii) one or more indicator features of the respective search query of the respective search query term pair;
receiving, via the computing system, a search query including a plurality of search terms, the search query being received from a computing device of a user;
selecting, via the computing system, a search term from the plurality of search terms from the search query;
when the search query and the search term match the respective search query term pair for one of the one or more term optionalization records in the term optionalization list:
determining an optionalization probability based on the respective predetermined optionalization probability associated with the one of the one or more term optionalization records;
when the search query and the search term do not match the respective search query term pair for any of the one or more term optionalization records in the term optionalization list:
selecting, via the computing system, a session log from the plurality of session logs;
generating, via the computing system, an average conversion rate associated with the search query conversion list associated with the plurality of session logs, as matched; and
generating, via the computing system, the optionalization probability associated with the search term, as selected, wherein the optionalization probability is a function of the average conversion rate and represents a likelihood that the search term is optional from the search query;
determining, via the computing system, whether to retain the search term, as selected, within the search query, as a function of the optionalization probability, wherein the search term from the search query is retained when the optionalization probability for the search term is less than a predefined probability given a context of the search query;
generating, via the computing system, a search request as a function of the search query, wherein the search request includes or does not include the search term, as selected, based on the determining whether the search term, as selected, is retained or not retained, respectively;

retrieving, via the computing system, product records of the plurality of product records from the database as a function of the search request; and transmitting, via the computing system, instructions generating and displaying a product search result including product information associated with the product records, as retrieved, based on the optionalization probability associated with (a) the search term, as selected, or (b) the average conversion rate.

12. The method in accordance with claim 11, further comprising:

generating a modified search query with the search request including removing the search term, as selected, from the search query when the optionalization probability is greater than a predefined probability.

13. The method in accordance with claim 11, further comprising:

selecting a bigram within the search query including the search term, as selected; and determining a bigram frequency of the bigram appearing in the plurality of product records, wherein the optionalization probability is a function of the bigram frequency.

14. The method in accordance with claim 11, further comprising:

selecting a trigram within the search query including the search term, as selected; and determining a trigram frequency of the trigram appearing in the plurality of product records, wherein the optionalization probability is a function of the trigram frequency.

15. The method in accordance with claim 14, further comprising:

determining a number of product records of the plurality of product records having product information matching the trigram, as selected; and determining the optionalization probability as a function of the average conversion rate and a number of matching product titles.

16. The method in accordance with claim 11, further comprising:

determining a number of product records of the plurality of product records having product information matching the search query, wherein the optionalization probability is a function of the number of matching product records.

17. The method in accordance with claim 11, further comprising:

determining whether an adjacent term in the search query is included in a predefined set of terms, wherein the search request includes a word being retained in the search query upon determining the adjacent term is included in the predefined set of terms.

18. The method in accordance with claim 11, further comprising:

identifying session logs of the plurality of session logs included in the database having corresponding search queries matching the search query, as received; and determining a number of subsequent session logs including reformulated search queries that remove the search term, as selected, wherein the optionalization probability is a function of the average conversion rate and a number of reformulated search queries.

19. The method in accordance with claim 18, further comprising:

removing the search term, as selected, from the search query to generate a modified search query;

determining a number of session logs of the plurality of session logs having corresponding search queries matching the modified search query, wherein the optionalization probability is a function of the average conversion rate and the number of session logs.

20. One or more non-transitory computer-readable storage media, having computer-executable instructions embodied thereon, wherein when executed by at least one processor, the computer-executable instructions cause the at least one processor to perform:

storing in a database a plurality of product records including product information associated with a plurality of products and a plurality of session logs, wherein the plurality of session logs comprise a plurality of search queries that match corresponding session logs of the plurality of session logs, and wherein the plurality of session logs comprise a plurality of product categories associated with a plurality of web pages;

storing in the database a search query conversion list comprising a plurality of conversion records associated with the plurality of session logs;

storing in the database a term optionalization list comprising one or more term optionalization records, wherein each optionalization record of the term optionalization list comprises (i) a respective search query term pair and (ii) a respective predetermined optionalization probability, wherein the respective search query term pair comprises a respective search query and a respective search term of the respective search query, and wherein an optionalization prediction of one or more functional words within the respective search query of the respective search query term pair is generated by a decision function based on (i) at least one or more features of the respective search query term pair and (ii) one or more indicator features of the respective search query of the respective search query term pair;

receiving a search query including a plurality of search terms, the search query being received via a computing device of a user;

selecting a search term from the plurality of search terms from the search query;

when the search query and the search term match the respective search query term pair for one of the one or more term optionalization records in the term optionalization list:

determining an optionalization probability based on the respective predetermined optionalization probability associated with the one of the one or more term optionalization records;

when the search query and the search term do not match the respective search query term pair for any of the one or more term optionalization records in the term optionalization list:

selecting a session log from the plurality of session logs;

generating an average conversion rate associated with the search query conversion list associated with the plurality of session logs, as matched; and generating the optionalization probability associated with the search term, as selected, wherein the optionalization probability is a function of the average conversion rate and represents a likelihood that the search term is optional from the search query;

determining whether to retain the search term, as selected, within the search query, as a function of the optionalization probability, wherein the search term from the search query is retained when the optionalization probability for the search term is less than a predefined probability given a context of the search query;

generating a search request as a function of the search query, wherein the search request includes or does not include the search term, as selected, based on the determining whether the search term, as selected, is retained or not retained, respectively;

retrieving product records of the plurality of product records from the database as a function of the search request; and transmitting instructions to generate and display a product search result including product information associated with the product records, as retrieved, based on the optionalization probability associated with (a) the search term, as selected, or (b) the average conversion rate.

* * * * *